United States Patent
Shepelev et al.

(10) Patent No.: US 10,095,358 B2
(45) Date of Patent: Oct. 9, 2018

(54) METHOD FOR DRIVING TOUCH SENSOR TO ACHIEVE FASTER SENSOR SETTLING

(71) Applicant: Synaptics Incorporated, Santa Clara, CA (US)

(72) Inventors: Petr Shepelev, San Jose, CA (US); Adam Schwartz, Redwood City, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 687 days.

(21) Appl. No.: 13/728,691

(22) Filed: Dec. 27, 2012

(65) Prior Publication Data

US 2014/0049509 A1    Feb. 20, 2014

Related U.S. Application Data

(60) Provisional application No. 61/683,173, filed on Aug. 14, 2012.

(51) Int. Cl.
| | |
|---|---|
| G06F 3/044 | (2006.01) |
| G06F 3/041 | (2006.01) |
| G09G 3/36 | (2006.01) |

(52) U.S. Cl.
CPC ............ G06F 3/044 (2013.01); G06F 3/0416 (2013.01); *G09G 3/3688* (2013.01)

(58) Field of Classification Search
None
See application file for complete search history.

(56) References Cited

U.S. PATENT DOCUMENTS

| | | |
|---|---|---|
| 2007/0070049 A1 | 3/2007 | Lee et al. |
| 2009/0002312 A1 | 1/2009 | Son |
| 2009/0009498 A1* | 1/2009 | Nishimura ............ 345/205 |
| 2009/0267914 A1 | 10/2009 | Dews et al. |
| 2010/0207889 A1 | 8/2010 | Chen et al. |
| 2011/0001491 A1 | 1/2011 | Huang et al. |
| 2011/0067933 A1 | 3/2011 | Chang et al. |
| 2011/0122087 A1 | 5/2011 | Jang et al. |
| 2011/0134154 A1* | 6/2011 | Miyachi et al. ........ 345/690 |

(Continued)

FOREIGN PATENT DOCUMENTS

| | | |
|---|---|---|
| CN | 101339752 A | 1/2009 |
| CN | 102112951 A | 6/2011 |
| JP | 2009015178 A | 1/2009 |

(Continued)

OTHER PUBLICATIONS

International Search Report and Written Opinion dated Aug. 30, 2013 for Application No. PCT/US2013/044815.

(Continued)

*Primary Examiner* — William Boddie
*Assistant Examiner* — Bipin Gyawali
(74) *Attorney, Agent, or Firm* — Patterson + Sheridan, LLP (57) ABSTRACT

A method and system for driving capacitive pixels in a touch sensor device using a multi-level drive scheme. The drive scheme includes driving a transmitter electrode with a boosted voltage for a first period, and driving the transmitter electrode with a second voltage for a second period. The multi-level transmitter signal is determined based on different settling responses associated with the capacitive pixels of the touch sensor device.

33 Claims, 5 Drawing Sheets

(56) References Cited

U.S. PATENT DOCUMENTS

2011/0316809 A1  12/2011  Kim et al.
2012/0113047 A1*  5/2012  Hanauer et al. .............. 345/174

FOREIGN PATENT DOCUMENTS

JP  2011197584 A  10/2011
JP  2012099081 A  5/2012

OTHER PUBLICATIONS

EP 1382915.3, Extended European Search Report dated Mar. 21, 2016, consists of 8 pages.
EP 1382915.3, Examination Report dated Feb. 17, 2017, consists of 6 pages.
Chinese Application No. 201380043099.7—Office Action dated Nov. 29, 2016 with English Translation. consists of 28 pages.
Japanese Application No. P2015-527452—Office Action dated Feb. 16, 2017 with English Translation. consists of 6 pages.
Chinese Application No. 201380043099.7—Office Action dated Jul. 19, 2017 with English Translation. consists of 8 pages.

\* cited by examiner

METHOD FOR DRIVING TOUCH SENSOR TO ACHIEVE FASTER SENSOR SETTLING

CROSS-REFERENCE TO RELATED APPLICATIONS

This application claims benefit of U.S. provisional patent application Ser. No. 61/683,173, filed Aug. 14, 2012, entitled "Method and Apparatus for Fast Settling," which is herein incorporated by reference.

BACKGROUND OF THE INVENTION

Field of the Invention

Embodiments of the present invention generally relate to driving loads in electronic devices, or more specifically, driving a transmitter signal in a capacitive sensing device.

Description of Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

To operate electronic devices, such as displays and input devices, it is often necessary to drive a load. The time required to drive the load may be a function of a resistance and/or a capacitance (i.e., an RC time constant). Conventional driving methods use two voltage levels (i.e., a high level and a low level). For example, a transmitter electrode in a touch sensor device may be driven with a waveform comprising a series of square waves. The frequency of the waveform, however, may be limited because it is necessary to provide a sensing cycle long enough to allow the transmitter electrode to "settle" to a desired value. Settling time tends to increase as the resistance and/or capacitance increases. For example, driving a load using thinner and longer electrical conductors may increase resistance, and driving a physically larger load may increase capacitance. As a result, the RC time constant may be longer. However, long settling times may be undesirable due to noise and system performance which may require operating an electronic device at high frequencies. Accordingly, it is desirable to decrease settling times of electronic devices.

BRIEF SUMMARY OF THE INVENTION

Disclosed is a method for decreasing the amount of time required for a load to settle when driven. In particular, the settling time can be reduced by driving the load with multiple voltage levels comprising, for example, a boosted voltage. According to various embodiments, the load can be a component of an electronic device, such as a display component or a sensor component. According to various embodiments, the load can be associated with driving a pixel in a display or with driving the transmitter electrodes of a touch sensor device.

One embodiment of the present invention provides a method for driving a sensor. The method further includes applying a first voltage to a first transmitter electrode for a first duration based on a first settling response associated with the first transmitter electrode, wherein the first voltage is greater than an ending voltage of the first transmitter electrode. The method includes applying a second voltage to the first transmitter electrode for a second duration based on a second settling response for the sensor, wherein applying the first voltage and applying the second voltage is based on the first settling response and the second settling response. The first settling response and the second settling response may be different.

One embodiment of the present invention further includes a processing system having a driver module having driver circuitry configured for coupling to a first capacitive pixel associated with a first settling response and a second capacitive pixel associated with a second settling response. The first capacitive pixel includes a first transmitter electrode and a first receiver electrode. The driver module is configured to apply a first voltage to the first transmitter electrode for a first duration, the first voltage being greater than an ending voltage of the first capacitive pixel. The driver module is further configured to apply a second voltage to the first transmitter electrode for a second duration. The first voltage and the second voltage are selected based on the first settling response and the second settling response.

Another embodiment of the present invention provides a display device having an integrated display device. According to an embodiment, the display device includes a plurality of capacitive pixels configured to be driven for capacitive sensing, including a first capacitive pixel associated with a first settling response and a second capacitive pixel associated with a second settling response. The first capacitive pixel may include a first transmitter electrode and a first receiver electrode. The display device further includes a processor coupled to the first capacitive pixel and the second capacitive pixel and configured to apply a first voltage to the first transmitter electrode for a first duration. The first voltage is greater than an ending voltage of the first capacitive pixel. The processor is further configured to apply a second voltage to the first transmitter electrode for a second duration, wherein the first voltage and the second voltage are selected based on the first settling response and the second settling response.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION OF THE INVENTION

Embodiments of the present invention describe an approach for driving a capacitive sensor using a driving signal having multiple levels. The multi-level drive scheme decreases the time required for the settling of the capacitive sensor, thereby enabling an increased sensing frequency (for a given settling requirement). Conventional driving techniques use two levels; a high and low level producing a square-wave. The sensing cycle duration is constrained to be long enough to allow the capacitive sensor to settle to some level (e.g., within 95% of the target level). As sensor become thinner and larger, and design requirements become more extreme (requiring smaller pitch), settling behavior is becoming a more important factor. Lower sensing frequency leads to degradation in the noise performance. Accordingly, embodiments of the present invention provide a technique for increasing the sensing frequency that leads to significant gains in capacitive sensor performance.

Figure 1:
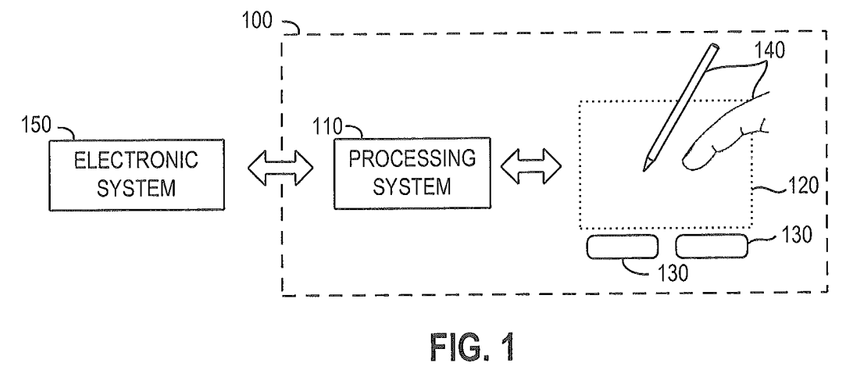
FIG. 1 is a block diagram of an exemplary system that includes an input device according to an embodiment of the invention.

FIG. 1 is a block diagram of an exemplary input device 100, in accordance with embodiments of the present technology. In one embodiment, input device 100 comprises a display device having an integrated sensing device. Although embodiments of the present disclosure may be utilized in a display device integrated with a sensing device, it is contemplated that the invention may be embodied in display devices without integrated input devices. The input device 100 may be configured to provide input to an electronic system 150. As used in this document, the term "electronic system" (or "electronic device") broadly refers to any system capable of electronically processing information. Some non-limiting examples of electronic systems 150 include personal computers of all sizes and shapes, such as desktop computers, laptop computers, netbook computers, tablets, web browsers, e-book readers, and personal digital assistants (PDAs). Additional example electronic systems 150 include composite input devices, such as physical keyboards that include input device 100 and separate joysticks or key switches. Further example electronic systems 150 include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, settop boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. One embodiment of the processing system 110 having a set of modules (e.g., driver module, receiver module, etc.) is described later in conjunction with FIG. 2.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists).

In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device may share physical elements. For example, some embodiments may utilize some of the same electrical components for displaying and sensing. As another example, the display device may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
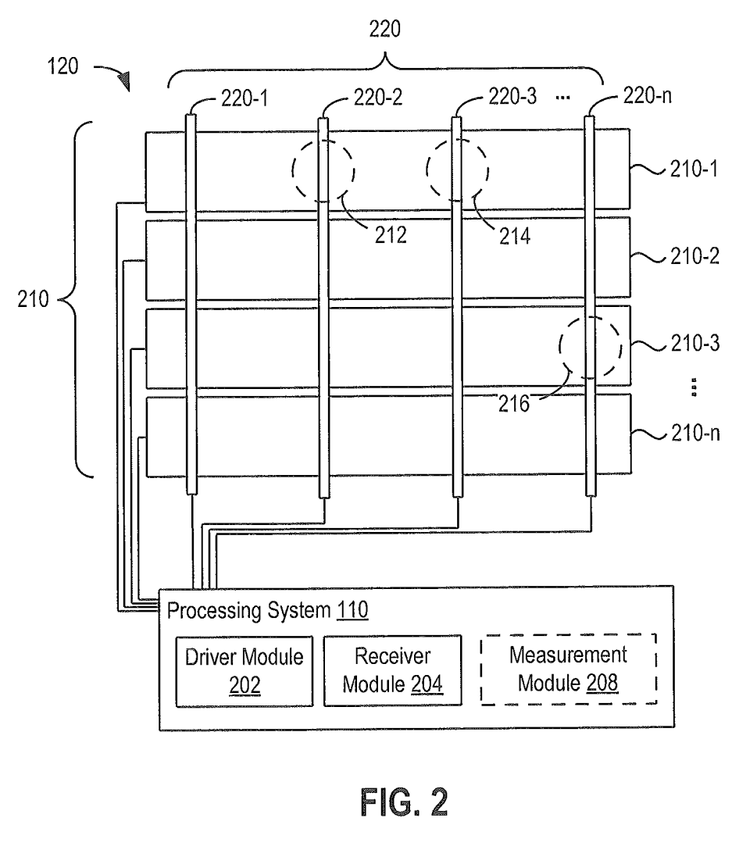
FIG. 2 shows one embodiment of the input device having an example sensor electrode pattern configured to sense in a sensing region associated with the pattern, according to an embodiment of the invention.

FIG. 2 shows one embodiment of the input device 100 with a portion of an example sensor electrode pattern configured to sense in the sensing region 120 associated with the pattern, according to some embodiments. For clarity of illustration and description, FIG. 2 depicts a sensor pattern as a plurality of simple rectangles, though it is understood that the array may have other geometric forms and/or various components not shown. This sensor electrode pattern comprises a plurality of transmitter electrodes 210 (210-1, 210-2, 210-3, . . . 210-n), and a plurality of receiver electrodes 220 (220-1, 220-2, 220-3, . . . 220-n) disposed over the plurality of transmitter electrodes 210.

Transmitter electrodes 210 and receiver electrodes 220 are ohmically isolated from each other. That is, one or more insulators separate transmitter electrodes 210 and receiver electrodes 220 and prevent them from electrically shorting to each other. In some embodiments, transmitter electrodes 210 and receiver electrodes 220 are separated by insulative material disposed between them at cross-over areas; in such constructions, the transmitter electrodes 210 and/or receiver electrodes 220 may be formed with jumpers connecting different portions of the same electrode. In some embodiments, transmitter electrodes 210 and receiver electrodes 220 are separated by one or more layers of insulative material. In some other embodiments, transmitter electrodes 210 and receiver electrodes 220 are separated by one or more substrates; for example, they may be disposed on opposite sides of the same substrate, or on different substrates that are laminated together.

The areas of localized capacitive coupling between transmitter electrodes 210 and receiver electrodes 220 may be termed "capacitive pixels." For example, the embodiment shown in FIG. 2 illustrates a first capacitive pixel 212 (depicted as a dashed circle) located at the intersection of the transmitter electrode 210-1 and the receiver electrode 220-2. As another example, the sensing region 120 includes a second capacitive pixel 214 located at the intersection of the same transmitter electrode 210-1 and a different receiver electrode 220-3 as the first capacitive pixel 212. In yet another example, the sensing region 120 includes a third capacitive pixel 216 located at the intersection of a different transmitter electrode 210-3 and a different receiver electrode 220-n. The capacitive coupling between the transmitter electrodes 210 and receiver electrodes 220 change with the proximity and motion of input objects in the sensing region associated with the transmitter electrodes 210 and receiver electrodes 220.

In some embodiments, the sensor pattern is "scanned" to determine these capacitive couplings. That is, the transmitter electrodes 210 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 220 to be independently determined.

The receiver sensor electrodes 220 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, transmitter electrodes 210 comprise one or more common electrodes (e.g., "V-com electrode") used in updating the display of the display screen. These common electrodes may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), coupled to one end of an organic light emitting diode (OLED) etc. In such embodiments, the common electrode can also be referred to as a "combination electrode", since it performs multiple functions. In various embodiments, each transmitter electrode 210 comprises one or more common electrodes. In other embodiments, at least two transmitter electrodes 210 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g., combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a third display updating state is considered to be of a third frame type, and so on. Where the relationship of display update state and capacitive image acquisition is periodic, capacitive images acquired cycle through the frame types and then repeats.

In one embodiment, the processing system 110 includes a driver module 202 having driver circuitry (not shown) configured for coupling to the plurality of transmitter electrodes 210. The driver module 202 is configured to drive one or more of the transmitter electrodes 210 by applying a voltage to one or more of the transmitter electrodes 210. The processing system 110 may further includes a receiver module 204 having receiver circuitry (not shown) coupled to the plurality of receiver electrodes 220 and configured to operate the receiver electrodes 220 to acquire resulting signals while one or more of the transmitter electrodes 210 are driven. In some embodiments, the processing system 110 may include a measurement module 208 configured to facilitate with tuning the methods for driving the plurality of transmitter electrodes 210, and is described in greater detail later.

Figure 3:
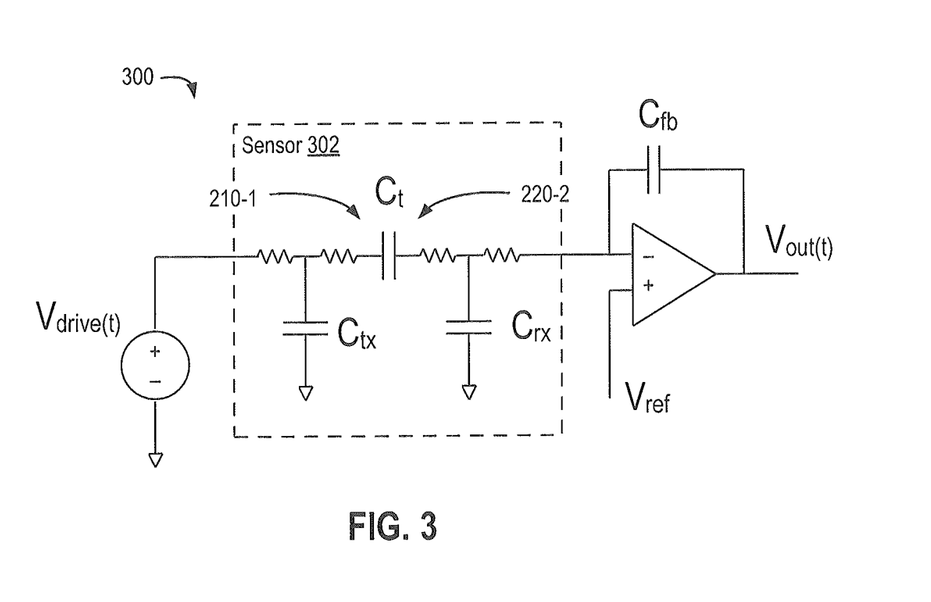
FIG. 3 shows a schematic diagram of a touch sensor device with associated driving and receiving circuitry according to an embodiment of the invention.

FIG. 3 show a schematic diagram of an example touch sensor circuitry 300 comprising a sensor 302, drive circuitry, and receiver circuitry. FIG. 3 depicts a simplified abstraction of a trans-capacitive pixel in the capacitive sensor 302 as a circuit of resistors and capacitors. By way of example, the touch sensor circuitry 300 shown may correspond to the first capacitive pixel comprised of the intersection of the transmitter electrode 210-1 and the receiver electrode 220-2. It is understood that FIG. 3 illustrates but one example of a load that is driven according to embodiments of the present invention, and that other embodiments are contemplated, for example, in other configurations of touch sensor circuitry, in other types of sensors, and in other circuitry for display and input devices.

In the embodiment shown, the driver circuitry applies a driving signal $V_{drive}(t)$ to one or more of transmitter electrodes of the sensor (e.g., transmitter electrode 210-1). The receiver circuitry coupled to one or more receiver electrodes (e.g., receiver electrode 220-2) integrates the resulting signal to generate $V_{out}(t)$. As such, each transmitter electrode 210 and receiver electrode 220 of the sensor may be regarded a distributed RC network, which can be approximated as a single pole for each electrode. Thus, the overall behavior of the touch sensor circuitry 300 shown in FIG. 3 is that of a "second-order" system; the trans-capacitance acts as a differentiator producing charge that is subsequently integrated by a touch controller receiver (e.g., receiver module 204). It should be appreciated that the second order model is a model of reasonable fidelity, and is presented herein as an example model. Even though the actual sensor may exhibit more complex behavior, the model captures the behavior demonstrating the advantage of embodiments of the invention described herewith.

In one embodiment, the capacitive pixels of the sensor 302 may have varying "settling responses" based on the characteristics of the embodying touch sensor circuitry. A settling response refers to the behavior of the capacitive pixel as expressed by an output signal in response to being driven by a certain voltage signal (e.g., a transmitter signal). The settling response for a capacitive pixel is determined by values of the resistors and capacitors of the touch sensor circuitry 300 shown in approximation in FIG. 3. Settling responses may vary from capacitive pixel to capacitive pixel in the same sensor. In many cases, small variations in resistance and capacitance along the sensor electrode pattern of the input device may result in a first capacitive pixel having a faster settling response than a second capacitive pixel. For example, capacitive pixels which are farther from drive circuitry may have longer settling times than capacitive pixels which are close to the drive circuitry because of the higher resistance caused by longer routing traces or wires. Further, ranges for settling responses of capacitive pixels can be different for different types of sensors.

In one embodiment, a settling time for a capacitive pixel describes the time required for the output of the capacitive pixel to reach and stay within a range or certain percentage of a target value (e.g., with 2-5% of an ending output) upon application of a particular voltage signal.

Figure 4:
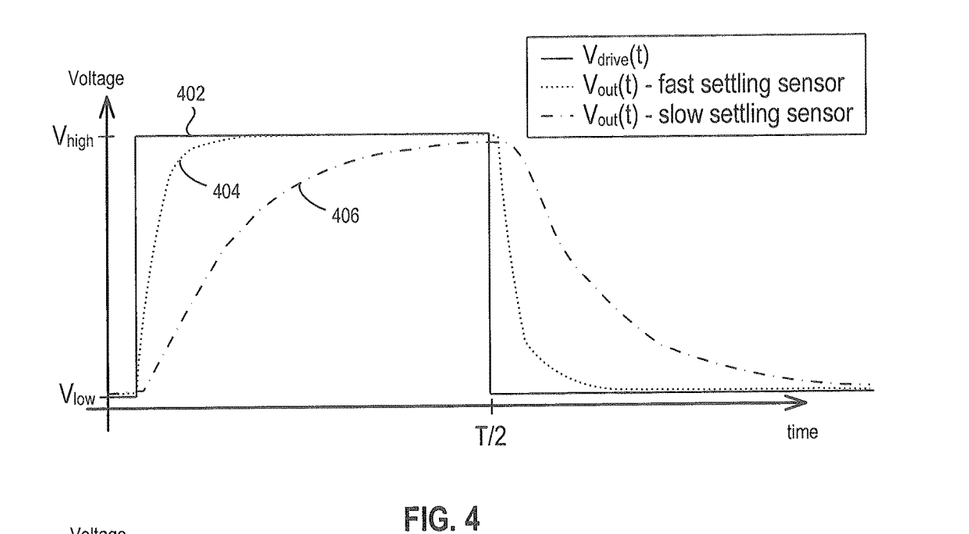
FIG. 4 illustrates settling characteristics of a sensor according to a conventional approach to driving the touch sensor device.

FIG. 4 illustrates settling characteristics of a conventional driving method having high and low levels. For expediency, the driving methods described herein as described with respect to a capacitive touch sensor, but it is recognized that the method may be used with any capacitive or resistive sensing devices, or any loads associated with driving a pixel in a display or with driving the transmitter electrodes of a touch sensor device.

As shown, a conventional driving method uses a touch sensing signal 402, illustrated in FIG. 4 as a square waveform, that swings between voltage levels $V_{low}$ and $V_{high}$ with a period T. FIG. 4 further illustrates integrated signals $V_{out}(t)$ for two capacitive pixels having different settling responses: a first output signal 404 corresponding to a capacitive pixel having a fast settling response and a second output signal 406 corresponding to a capacitive pixel having a slow settling response. As can be seen in FIG. 4, slow settling pixels may take longer to transition to a desired voltage level (e.g., $V_{high}$, $V_{low}$) than the fast settling pixels.

Figure 5:
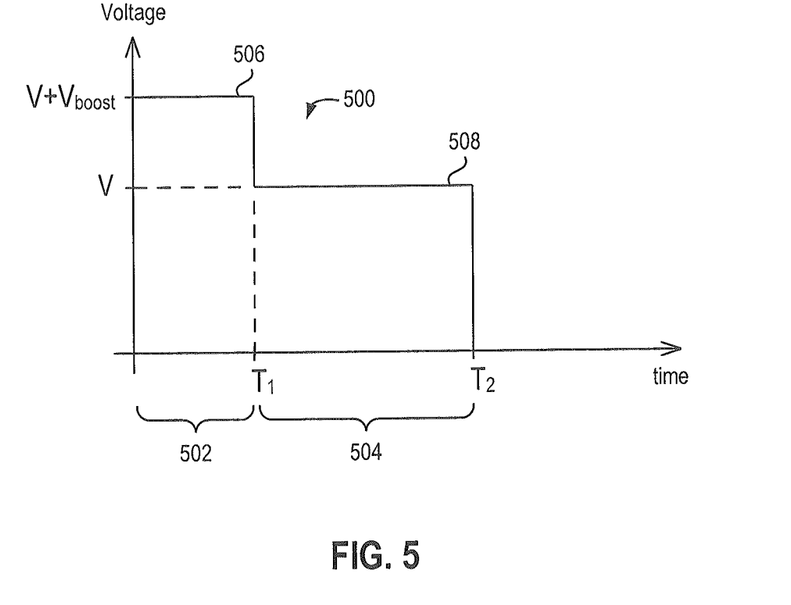
FIG. 5 shows a transmitter signal having a boosted voltage level, according to an embodiment of the invention.

According to embodiments of the present invention, it has been determined that the settling time for a "slow" pixel can be reduced by driving the pixel with a multi-level waveform. In particular, the touch sensing waveform applies "boost" voltages which are beyond the voltages to which the pixel settles to "overdrive" the pixel. By driving with the boost voltages, rather than with only the ending voltages (e.g., $V_{high}$ and $V_{low}$), it is possible to drive slow settling pixels harder to reduce their settling time to a desired voltage level (e.g., $V_{high}$ or $V_{low}$ levels). FIG. 5 illustrates a generalized depiction of one embodiment of a boosted touch sensing waveform 500 used for driving the sensor.

Figure 6:
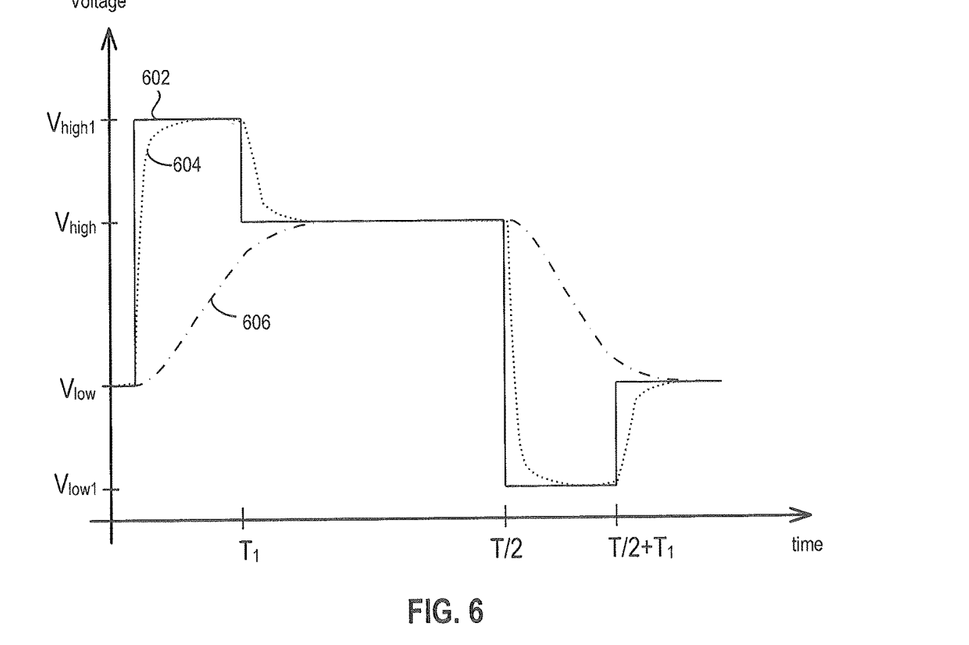
FIG. 6 illustrates settling characteristics of a sensor using a boosted waveform for driving a touch sensor device, according to an embodiment of the invention.

In this embodiment, the waveform 500 comprises a boost portion 506, where a boosted voltage level (e.g., $V+V_{boost}$) is applied for a first duration 502 (e.g., until time T1). The waveform 500 further includes a settling portion 508, where a second voltage level (e.g., V) applied for a second duration 504 (e.g., until time T2). In one embodiment, the voltage level of the boost portion 506 may be greater than the voltage level of the settling portion 508, polarity notwithstanding. Polarity refers to the sign of the voltage transition. Simply by convention, a transition resulting in an increase in voltage level is referred to as having a positive polarity whereas a transition resulting in a decrease in voltage level has a negative polarity. In some embodiments, the voltage level V refers to the voltage used during sensing operations. While the depicted waveform 500 is for driving a high level (e.g., $V_{high}$), it should be recognized that the multi-level waveform may be applied to a low voltage level (e.g., $V_{low}$ with boost to $V_{low1}$), as depicted in FIG. 6. It is further recognized that numerous approaches can be taken to determine optimized boost voltages (e.g., $V_{boost}$) and boost durations (e.g., duration 502) for achieving target settling times.

FIG. 6 illustrates settling characteristics of a sensor using a boosted waveform for driving a touch sensor device, according to an embodiment of the invention. The touch sensor device may be driven using a multi-level sensing signal 602 swinging between voltage levels $V_{low1}$ and $V_{high1}$ with a same period T as the signal 402 depicted in FIG. 4. Level $V_{high}$ is used in each first half-sensing period with a time offset $T_1$, and level $V_{low}$ is used in each second half-sensing period with the same time offset $T_1$. By driving with the boost voltages (e.g., $V_{high1}$ and $V_{low1}$), rather than only $V_{high}$ and $V_{low}$, the sensing signal 602 drives slow settling pixels (i.e., output signal 606) harder to reduce their settling time to a desired voltage level, such as either the $V_{high}$ or $V_{low}$ levels. FIG. 6 shows that both fast settling pixel (e.g., output signal 604) and slow settling pixels (e.g., output signal 606 ) settle to $V_{high}$ and $V_{low}$ faster than in conventional sensing shown in parallel in FIG. 4. As shown, the initial transitions exceed $V_{high}$-$V_{low}$. That is, the first transition $V_{low}$ to $V_{high1}$ exceeds $V_{high}$-$V_{low}$ by the amount $V_{boost}=V_{high1}-V_{high}$. The second transition also exceeds -($V_{high}$-$V_{low}$) by the amount -$V_{boost}$.

Accordingly, embodiments of the present invention provide a technique that decreases the time required for a load, such as a load associated with driving a pixel in a display or with driving the transmitter electrodes of a touch sensor device, to settle when driven. It has been determined that, in the case of a touch sensor device, decreasing the settling time enables the sensor to operate at higher frequencies, which provides a number of advantages.

For example, by using a transmitter signal with a boosted waveform that achieves a higher sensing frequency, an input device is able to average out more samples per transmitter signal for better noise mitigation (without having to decrease the touch report rate), or, in another case, increase the touch data report rate while averaging out the same number of samples per transmitter as in a conventional driving method. Further, the maximum sensing frequency for a given sensor may be raised using a boosted waveform, which makes interference avoidance easier (e.g., because interference energy tends to decrease with frequency).

In embodiments using multiplexing schemes sharing time for display updates and touch sensing (such as in-cell display technology), the described approach allows less time to be used for collection of touch data, thereby giving more time for a display update, and well as provide better mitigation of interference, as mentioned above.

Figure 7:
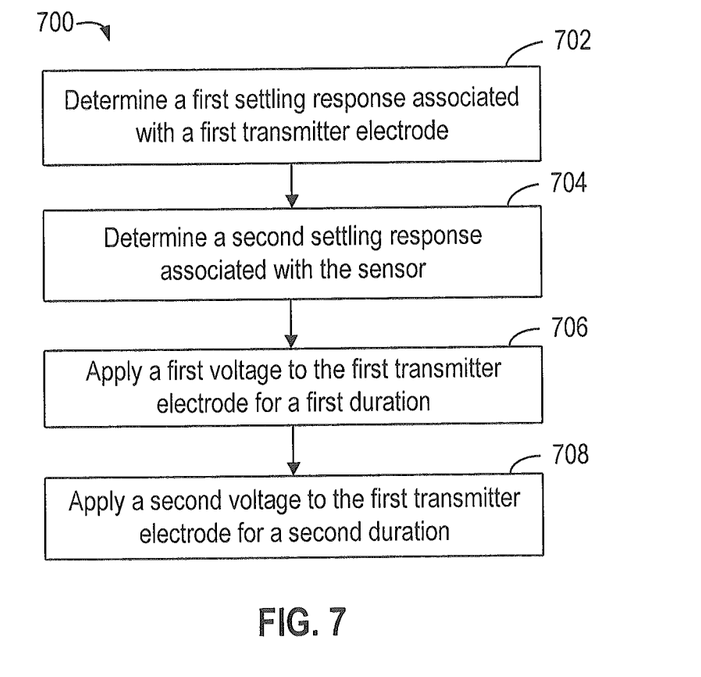
FIG. 7 is a flow diagram of a method for driving a sensor, according to one embodiment of the invention.

FIG. 7 is a flow diagram of a method 700 for driving a sensor, according to one embodiment of the invention. The method 700 begins at step 702, a first settling response associated with a first transmitter electrode is determined. In some embodiments, the first settling response may be associated with a first capacitive pixel (e.g., capacitive pixel 212) comprised of the first transmitter electrode (e.g., transmitter electrode 210-1) and a first receiver electrode (e.g., receiver electrode 220-2).

At step 704, a second settling response associated with the sensor may be determined, the second settling response being different from the first settling response. Various embodiments for the second settling response have been contemplated and some examples are discussed herein.

In one embodiment, the second settling response may be associated with the first transmitter electrode. For example, the second settling response may be associated with a second capacitive pixel 214 that shares the same transmitter electrode 210-1 as the first capacitive pixels, but includes a different receiver electrode 220-2.

In another embodiment, the second settling response may be associated with a second transmitter electrode. For example, the second settling response may be associated with a third capacitive pixel 216 comprised of a different transmitter electrode 210-3 and a different receiver electrode 220-n as the first capacitive pixel.

At step 706, the driver module 202 applies a first voltage to the first transmitter electrode for a first duration. The first voltage may be beyond an ending voltage of the first transmitter electrode, and may sometimes be referred to herein as a "boosted voltage." For example, when it is desired for the driver module 202 to increase the voltage on the first electrode, the boost voltage is higher (i.e., beyond) the voltage $V_{high}$ applied thereafter. In another example where it is desired to lower the voltage applied to the transmitter electrode, the boost voltage is lower (i.e., beyond) the voltage $V_{low}$ applied thereafter.

At step 708, the driver module 202 applies a second voltage to the first transmitter electrode for a second duration. In some embodiments, the application of the first and second voltages may be based on the first settling response and second settling response determined in steps 702 and 704. In some embodiments, the first and second durations may be selected based on the first settling response and the second settling response. The first and second durations may be selected to cause a first settling time associated with the first settling response and a second settling time associated with the second settling response to be similar. The first and second durations may be selected to cause the first and second settling times to be similar, the same, or substantially the same, in one instance.

It should be recognized that these durations can be chosen to support a variety of use cases, including driving a single boosted waveform for the entire electronic device 150, different boosted waveforms for different groups of capacitive pixels (e.g., lines of pixels), or different boosted waveforms for individual pixels. In one embodiment where a single waveform may be used for the entire sensor pattern, the single waveform having the first and second durations may be used such that the settling time for all capacitive pixel in the sensor pattern are the same. For example, the same waveform may be used to drive transmitter electrodes 210-1 and 210-3 when performing capacitive for capacitive pixels 212 and 216, respectively, such that the settling time for the capacitive pixels 212 and 216 are similar.

In one example embodiment where different waveforms are used for different groups of capacitive pixels, a different waveform may be selected for each group of capacitive pixels such that the settling time for all capacitive pixels within each group is similar. In some embodiments, the capacitive pixels may be organized relative to their corresponding transmitter electrodes. As such, a different waveform may be associated and used for each transmitter electrode, each waveform having their own respective first and second durations selected based on different settling responses of capacitive pixels having that transmitter electrode. For example, a waveform having the first and second durations may be selected for a line of capacitive pixels associated with the transmitter electrode 210-1 (including capacitive pixels 212 and 214), such that the settling time for the slowest settling capacitive pixel in that line of pixels and the settling time for the fastest settling capacitive pixel in that line of pixels are similar.

In another embodiment where different waveforms are used for different groups of capacitive pixels, different waveforms may be selected for driving different groups of transmitter electrodes at once, such as in a code division multiplexing (CDM) scheme for driving the sensor pattern. In such an embodiment, a waveform may be selected for each group of transmitter electrodes such that the settling time for all capacitive pixels associated with all transmitter electrodes in that group is similar. For example, in a case where a CDM driving scheme has the transmitter electrodes 210-1 and 210-3 drive at the same time, the waveform may be selected such that settling time for all capacitive pixels (including capacitive pixels 212, 214, and 216) associated with the transmitter electrodes 210-1 and 210-3 is similar.

In embodiments where different waveforms are used, it should be recognized that the different waveforms having respective first and second durations may be used to achieve a common settling time. For example, a line of pixels associated with transmitter electrode 210-1 may overall have a slower settling response than a line of pixels associated with the transmitter electrode 210-3. In such a case, the waveform used to drive the transmitter electrode 210-1 may be selected having a first duration for driving a boosted voltage and a second duration for driving a settling voltage, and the waveform used to drive the transmitter electrode 210-3 may be selected having a third duration (different from the first duration) for driving a boosted voltage and a fourth duration (different from the second duration) for driving a settling voltage, such that the settling times for all capacitive pixels are similar.

In one embodiment, the first and second voltages may also be selected based on the first settling response and the second settling response. According to various embodiments, the electronic device 150 may be configured to provide specific voltage levels (e.g., $V_{high1}$ and $V_{low1}$ voltages). Alternatively, it may be possible to use voltages already present in the electronic device to minimize the number of voltages that must be provided in the electronic device. Further, it should be recognized that the above discussion regarding waveforms selected for various use cases is applicable to the selection of the first and second voltage, i.e., that a waveform having first and second voltages may be selected such that the settling times associated with different settling responses (whether over the entire sensor pattern, within a group of capacitive pixels, etc.) are similar.

In one embodiment, the durations for applying the "boost" voltages for a given sensor may be determined based on an analysis of the capacitive pixel system as a second-order system, such as depicted in FIG. 3. It has been determined that a settling response for a sensor (e.g., capacitive pixel 212) may be similar to that of a second-order system with poles time-constraints of roughly RC/2. An analysis of the capacitive pixel system may be as follows.

In one embodiment, the Laplace transform of a second order system (assuming the receiver and transmitter poles are not at the same frequency) may be:

$$H(s) = \frac{\alpha\beta}{(s+\alpha)(s+\beta)} \quad (1)$$

The Laplace transform of the step response includes a 1/s to integrate the charge flowing through the sensor and producing the voltage at the output of the integrator in FIG. 3:

$$V_{out}(s) = \frac{\alpha\beta}{s(s+\alpha)(s+\beta)} \quad (2)$$

wherein $V_{out}$ represents the integrated receive signal. The time-domain step response is thus:

$$v_{out}(t) = v_{out}(0) + \left[1 + \frac{\beta e^{-\alpha t} - \alpha e^{-\beta t}}{\alpha - \beta}\right](v_{in} - v_{out}(0))u(t) \quad (3)$$

where u(t) is the unit step function.

In one embodiment, assuming a nomenclature as depicted in FIG. 3, where a voltage signal $V_{boost}$ is applied for a time $T_1$ and a voltage level V is applied until a time $T_2$, the response up to time $T_1$ is determined by:

$$v_{out}(T_1) = \left[1 + \frac{\beta e^{-\alpha T_1} - \alpha e^{-\beta T_1}}{\alpha - \beta}\right](V + V_{boost}) \quad (4A)$$

Further, the final response at time $T_2$ is determined by the function shown in Equation 4B below:

$$v_{out}(T_2) = v_{out}(T_1) + \quad (4B)$$

$$\left[\frac{1 + \frac{\beta e^{-\alpha(T_2 T_1)} - \alpha e^{-\beta(T_2 - T_1)}}{\alpha - \beta}}{}\right](V - v_{out}(T_1))$$

$$= V - \frac{\beta e^{-\alpha(T_2 - T_1)} - \alpha e^{-\beta(T_2 - T_1)}}{\alpha - \beta}\left[V_{boost} + \frac{\beta e^{\alpha T_1} - \alpha e^{-\beta T_1}}{\alpha - \beta}(V + V_{boost})\right]$$

In some embodiments, the voltage levels available for driving a capacitive pixel (e.g., V and $V_{boost}$) are fixed. For example, in electronic systems having available voltage levels of V=6 and $V_{boost}$=3, voltage levels used for driving may be $V_{low1}$=0, $V_{low}$=3, $V_{high}$=6 and $V_{high1}$=9 in one instance. In these embodiments, the boosted waveform may be optimized around the duration for applying a preconfigured voltage level to achieve a desired settling time in one or more sensors.

In one embodiment, a boost duration $T_1$ for a plurality of pixels may be determined based on a "slowest" settling pixel and "fastest" settling pixel of the plurality of pixels for which the settling time is to be similar. As such, in the Equation 4B above, let $(\alpha_1, \beta_1)$ be the poles of the "slowest" settling pixel on the sensor and $(\alpha_2, \beta_2)$ be the poles for the "fastest" settling pixel on the sensor. Accordingly, embodiments of the present invention are configured to select a boost duration $T_1$ and voltage $V_{boost}$ to cause a settling time $T_2$ such that the following conditions are met:

(i) $V_{out}(T_2)=(1-c)V$ where c≈5% is the settling requirement for the slowest pixel;
(ii) $T_2$ is minimized; and
(iii) The fastest settling pixel is also settled to at least $(1+c)V$.

Condition (iii) is set forth because simply choosing $T_1=T_2$ and solving Equation 4(a) to satisfy the first condition (i) may cause the fastest settling pixel to overshoot. A number of approaches for satisfying the three conditions (i)-(iii) are described below.

According to one approach, time periods for applying a boost voltage may be determined using a numerical optimization approach, in which the responses for the slowest and fastest settling pixels may be incorporated as part of an optimization problem. For example, let $v_{out1}$ correspond to the response for the slowest settling pixel and $v_{out2}$ correspond to the response of the fastest settling pixel. The values corresponding to $(\alpha_1,\beta_1)$ and $(\alpha_2,\beta_2)$ may be empirically measured for the sensor. As such, given:

$$v_{out1}(T_2)=F(\alpha_1,\beta_1, V_{boost}, T_1) \quad (5A)$$

$$v_{out2}(T_2)=F(\alpha_2,\beta_2, V_{boost}, T_1) \quad (5B)$$

Accordingly, for a given embodiment with a preconfigured voltage V and $V_{boost}$, the selection of a boost duration $T_1$ may be expressed as an optimization problem to minimize (e.g., decrease) the settling time $T_2$, as follows:

$$\min_{T_1} T_2 \quad (6)$$

$$\ni \begin{array}{l} v_{out1}(T_2) > (1-c)V \\ v_{out2}(T_2) < (1+c)V \end{array}$$

In some embodiments, the Equation 6 may be solved as a tractable numerical optimization problem, according to well-known techniques for performing numerical optimization. Alternatively, an iterative tuning technique, as described next, can solve Equation (6).

According to another approach, the voltages and the time periods for applying the boost voltages may be determined via dynamic tuning. In one embodiment, the electronic device 150 may be configured to provide feedback to monitor a settling time of one or more capacitive pixels. For example, in the case of a touch sensor device, a receiver can be provided to monitor the signal driving a transmitter. In one embodiment, the processing system 110 may include a measurement module 208 (as shown in FIG. 2) configured to measure the voltage response for a particular capacitive pixel at a given point in time (e.g., $v_{out1}(t)$). On the basis of the received feedback, the boost periods and voltages can be adjusted to achieve a desired settling time.

In one embodiment, the measurement module 208 may be configured to determine a duration $T_1$ for applying a boost voltage by iteratively incrementing the duration $T_1$ for applying the boost voltage until a first capacitive pixel 212 being measured overshoots an ending voltage at a settling time associated with the second capacitive pixel 214. In this embodiment, it is assumed that first settling response associated with the first capacitive pixel is faster than the second settling response associated with the second capacitive pixel. This tuning algorithm is shown in Table 1 below, however, other embodiments for dynamically tuning, not limited to the measurement module 208, may be used.

1. Set $T_1 = 0$.
2. Set $T_1 = T_1 + 1$, where $T_1$ is measured in clock cycles
3. Determine $T_2$ for the slowest pixel such that $v_{out1}(T_2) > (1 - c)V$
4. If $v_{out2}(T_2) < (1 + c)V$ :
   a. then go to step 2
   b. else set $T_1 = T_1 - 1$ and exit.

Table 1: Example Tuning Algorithm

As shown in Table 1, the tuning algorithm initializes the boost duration $T_1$ to zero. At each iteration of the tuning algorithm, the boost duration $T_1$ is incremented, and the settling time T2 for the slowest settling pixel is determined (i.e., such that $v_{out1}(T_2)>(1-c)V$). If the output signal of the fastest pixel at that same time $T_2$ has not overshot the target level V (i.e., $v_{out2}(T_2)<(1+c)V$), then the tuning algorithm repeats to step 2 (e.g., incrementing $T_1$) If the output signal of the fastest pixel at the same time $T_2$ has overshot the target level V, the tuning algorithm decrements the boost duration and exits.

Although an embodiment of the present invention is described in detail having a multi-level waveform with a single boost level (e.g., $V_{boost}$), it should be recognized that embodiments of the present invention may be extended to include a transmitter signal having multiple boost levels (i.e., a staircase waveform). For example, the driver module 202 may be configured to apply a third voltage (e.g., to the first transmitter electrode) for a third duration, wherein the third voltage and the third duration are selected to cause the first settling time and the second settling time to be similar. In another embodiment, the transmitter signal may be configured as a continuous function optimized to reduce settling time based on the settling responses.

Further, as described above, the number of boost levels, boost level voltages, and boost times, can be different for each electronic device, line, or individual pixel. In some embodiments, the slew-rates for the boost portion and the settling portion of the transmitter signal waveform can be different in order to (a) improve settling or (b) reduce spurious emissions. Waveform profiles other than step responses may also be used, e.g., sine waves, triangle waves, etc. Furthermore, it is possible to dynamically change the boost parameters based on feedback, such as a measurement of settling time.

Figure 8:
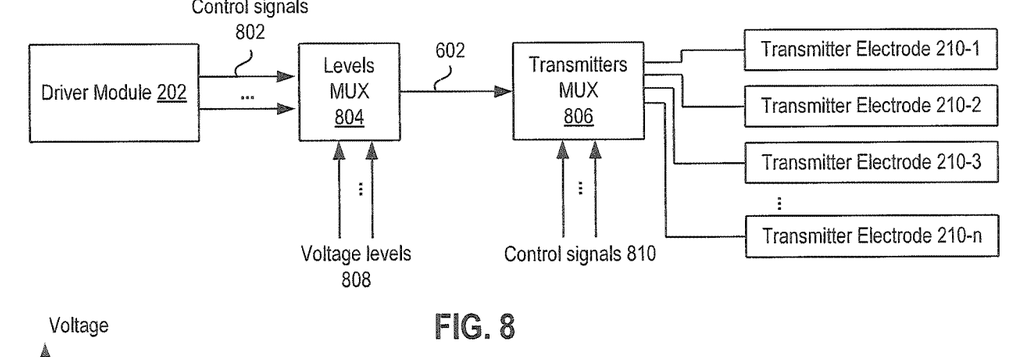
FIG. 8 is a block diagram of an exemplary system for driving a touch sensor device using a boosted waveform, according to an embodiment of the invention.

FIG. 8 is a block diagram of a driver module 202 configured to drive transmitter electrodes with a boosted waveform, according to an embodiment of the invention. The driver module 202 may supply a plurality of control signals 802 to multiplexors 804, 806 to generate a multi-level drive signal, as described above, for driving transmitter electrodes during capacitive sensing. The driver module 202 configured to generate the multi-level drive signal may be embodied in a variety of arrangements and configurations, including a separate ASIC, or as a part of an integrated touch and display IC. The multiplexors 804, 806 may also be arranged in various embodiments including in a separate display drive IC, in an integrated touch and display IC, or in circuits on glass of a display.

As shown in FIG. 8, the driver module 202 provides a plurality of control signals 802 to the multiplexors 804, 806 to drive a transmitter signal on one or more transmitter electrodes 210. In some embodiments, the control signals 802 may comprise digital logical signals encoding polarities and levels which are applied during different periods of a touch sensing waveform. The number of levels used and number of periods may vary based on the specific implementation. For example, let $N_{levels}$ be a number of used levels in one sensing period, then ceiling($\log_2(N_{levels})$) defines a number of logical control signals for a levels multiplexor 804. The timing, selection, and/or generation of voltages can be provided by any appropriate circuitry, software, or firmware. According to various embodiments, the applied voltages which are applied are generated, e.g., using a voltage regulator or supply. According to further embodiments, the applied voltages are selected from available voltage sources.

In the embodiment shown in FIG. 8, the driver module 202 provides control signals to the levels multiplexor 804 to select from a plurality of voltage levels 808 to use during capacitive sensing. Once a voltage level is selected, the resulting multi-level sensing signal 602 can be provided to circuitry (e.g., transmitter multiplexor 806) configured to drive transmitter electrodes for touch sensing, for example based on other control signals 810 to select active transmitter(s), which might come from the processing system 110, a display driver, or logic on glass.

Figure 9:
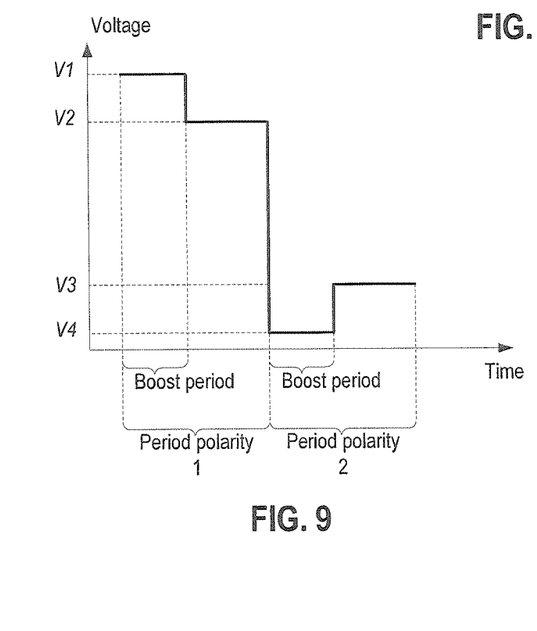
FIGS. 9-10 illustrates a boosted waveform and corresponding control signals for driving a touch sensor device, according to an embodiment of the invention.
Figure 10:
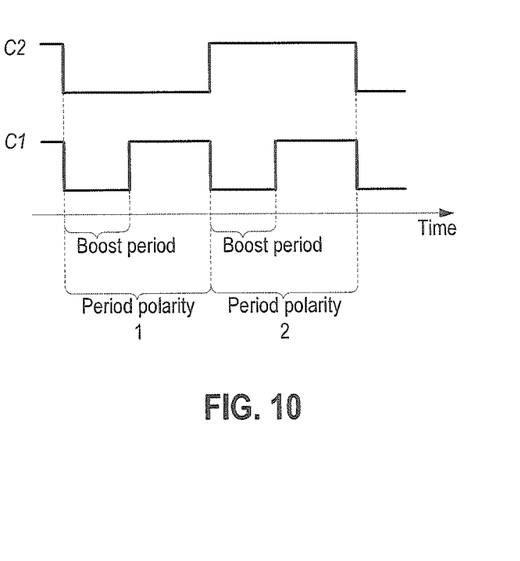

FIGS. 9-10 illustrates a boosted waveform and corresponding control signals for driving a touch sensor device, according to an embodiment of the invention. As shown in FIG. 9, the multi-level boost waveform comprising two polarities (e.g., $V_{high}$ and $V_{low}$), where each polarity comprises two different voltage levels. This results in waveform having four different voltage levels (i.e., V1, V2, V3, and V4). To provide these boost levels, two logical control signals, C1 and C2, shown in FIG. 10, are provided by the driver module 202 to the levels multiplexor 804. Control signals C1 and C2 select among voltage levels V1, V2, V3, and V4, which are used to drive the transmitter electrodes used to perform touch sensing. In some embodiments, the processing system 110 may include a plurality of registers (not shown) to configure the duration of boost periods and the duration of a period used for each polarity. In one embodiment, a mode of operation of the levels multiplexor 804 is defined by Table 2 below:

TABLE 2

| Model of Operation | | | | |
|---|---|---|---|---|
| Input: Control Signals | | | | |
| C1 | 0 | 1 | 0 | 1 |
| C2 | 0 | 0 | 1 | 1 |
| Output: Level | V1 | V2 | V3 | V4 |

In view of the foregoing, the scope of the present disclosure is determined by the claims that follow. However, those skilled in the art will recognize that the foregoing description and examples have been presented for the purposes of illustration and example only. The description as set forth is not intended to be exhaustive or to limit the invention to the precise form disclosed.

What is claimed is:

1. A method for driving a sensor, the method comprising:
driving a first transmitter electrode from a starting voltage to a target voltage comprising:
applying a first voltage to the first transmitter electrode for a first duration based on a first settling response associated with the first transmitter electrode, wherein the first voltage is greater than the starting voltage and the target voltage of the first transmitter electrode; and
applying the target voltage to the first transmitter electrode for a second duration based on a second settling response associated with the sensor, wherein the starting voltage and the target voltage are different, wherein the first settling response and the second settling response are different.

2. The method of claim 1, wherein the second settling response is associated with the first transmitter electrode.

3. The method of claim 1, wherein the second settling response is associated with a second transmitter electrode.

4. The method of claim 1, wherein the first duration and the second duration are selected based on the first settling response and the second settling response.

5. The method of claim 1, wherein the first settling response associated with the first transmitter electrode defines, at least in part, a settling time to reach and stay within a pre-determined range of the target voltage upon application of a voltage to the first transmitter electrode.

6. The method of claim 1, wherein the first duration and the second duration are selected to cause a first settling time associated with the first settling response and a second settling time associated with the second settling response to be the same.

7. The method of claim 6, further comprising:
applying a third voltage for a third duration, wherein the third voltage and the third duration are selected to cause the first settling time and the second settling time to be the same.

8. The method of claim 1, further comprising:
determining the first duration for applying the first voltage by iteratively incrementing the first duration for applying the first voltage until the first transmitter electrode overshoots an ending voltage at a settling time associated with the second settling response;
wherein the first settling response associated with the first transmitter electrode is faster than the second settling response.

9. The method of claim 1, wherein the applying the first voltage and the applying the target voltage comprises:
applying the first voltage to the first transmitter electrode for first duration and applying the target voltage to the first transmitter electrode for the second duration based on a first control signal indicating the first duration and the second duration.

10. A processing system, the processing system comprising:
a driver module having driver circuitry configured for coupling to a first capacitive pixel associated with a first settling response and a second capacitive pixel associated with a second settling response, wherein the first capacitive pixel comprises a first transmitter electrode and a first receiver electrode;
wherein the driver module is configured to drive the first transmitter electrode from a starting voltage to a target voltage comprising:
apply a first voltage to the first transmitter electrode for a first duration, wherein the first voltage is greater than the starting voltage and the target voltage of the first capacitive pixel, wherein the starting voltage and the target voltage are different; and
apply a second voltage to the first transmitter electrode for a second duration, wherein the first voltage and the second voltage are selected based on the first settling response and the second settling response.

11. The processing system of claim 10, wherein the second capacitive pixel comprises the first transmitter electrode and a second receiver electrode.

12. The processing system of claim 10, wherein the second capacitive pixel comprises a second transmitter electrode.

13. The processing system of claim 10, wherein the first duration and the second duration are selected based on the first settling response and the second settling response.

14. The processing system of claim 10, wherein the settling response associated with the first transmitter electrode defines, at least in part, a settling time to reach and stay within a pre-determined range of the target voltage upon application of a voltage to the first transmitter electrode.

15. The processing system of claim 10, wherein the first duration and the second duration are selected to cause a first settling time associated with the first capacitive pixel and a second settling time associated with the second capacitive pixel to be the same.

16. The processing system of claim 15, wherein the driver module is further configured to apply a third voltage for a third duration, wherein the third voltage and the third duration are selected to cause the first settling time and the second settling time to be the same.

17. The processing system of claim 10, further comprising:
a measurement module configured to determine the first duration for applying the first voltage by iteratively incrementing the first duration for applying the first voltage until the first capacitive pixel overshoots an ending voltage at a settling time associated with the second capacitive pixel;
wherein the first settling response associated with the first capacitive pixel is faster than the second settling response associated with the second capacitive pixel.

18. The processing system of claim 10, wherein the driver module is further configured to apply the first voltage to the first transmitter electrode for first duration and apply the second voltage to the first transmitter electrode for the second duration based on a first control signal indicating the first duration and the second duration.

19. A display device having an integrated sensing device, the display device comprising:
a plurality of capacitive pixels configured to be driven for capacitive sensing, comprising a first capacitive pixel associated with a first settling response and a second capacitive pixel associated with a second settling response, wherein the first capacitive pixel comprises a first transmitter electrode and a first receiver electrode;
a processor coupled to the first capacitive pixel and the second capacitive pixel, wherein the processor is configured to drive the first transmitter electrode from a starting voltage to a target voltage comprising:
apply a first voltage to the first transmitter electrode for a first duration, wherein the first voltage is greater than the starting voltage and the target voltage of the first capacitive pixel, wherein the starting voltage and the target voltage are different;
apply a second voltage to the first transmitter electrode for a second duration, wherein the first voltage and the second voltage are selected based on the first settling response and the second settling response.

20. The display device of claim 19, wherein the second capacitive pixel comprises the first transmitter electrode and a second receiver electrode.

21. The display device of claim 19, wherein the second capacitive pixel comprises a second transmitter electrode.

22. The display device of claim 19, wherein the first duration and the second duration are selected based on the first settling response and the second settling response.

23. The display device of claim 19, wherein the first settling response associated with the first capacitive pixel defines, at least in part, a settling time to reach and stay within a pre-determined range of the target voltage upon application of a voltage to the first transmitter electrode.

24. The display device of claim 19, wherein the first duration and the second duration are selected to cause a first settling time associated with the first capacitive pixel and a second settling time associated with the second capacitive pixel to be the same.

25. The display device of claim 24, wherein the processor is further configured to apply a third voltage for a third duration, wherein the third voltage and the third duration are selected to cause the first settling time and the second settling time to be the same.

26. The display device of claim 19, wherein the processor is further configured to determine the first duration for applying the first voltage by iteratively incrementing the first duration for applying the first voltage until the first capacitive pixel overshoots an ending voltage at a settling time associated with the second capacitive pixel;

wherein the first settling response associated with the first capacitive pixel is faster than the second settling response associated with the second capacitive pixel.

27. The display device of claim 19, wherein the processor is further configured to apply the first voltage to the first transmitter electrode for first duration and apply the second voltage to the first transmitter electrode for the second duration based on a first control signal indicating the first duration and the second duration.

28. A processing system, the processing system comprising:
  a driver module having driver circuitry coupled a plurality of transmitter electrodes, the drive driver module configured to drive a first transmitter electrode from a starting voltage to a target voltage comprising:
    apply a first voltage to the first transmitter electrode of the plurality of transmitter electrodes for a first duration;
    apply a second voltage to the first transmitter electrode for a second duration; and
    apply a third voltage to the first transmitter electrode for a third duration, wherein the first voltage is greater than the second voltage and the second voltage is greater than the third voltage, and the third voltage is greater than the starting voltage, and wherein the starting voltage and the target voltage are different; and
  a receiver module coupled to a plurality of receiver electrodes and configured to receive resulting signals with the receiver electrodes while the first voltage, the second voltage and the third voltage are applied to the first transmitter electrode.

29. The processing system of claim 28, wherein each of the plurality of transmitter electrodes comprise at least one common electrode of a display device.

30. The processing system of claim 28, wherein the driver module is further configured to apply a fourth voltage to the first transmitter electrode for a fourth duration and wherein the third voltage is greater than the fourth voltage.

31. The processing system of claim 28, wherein the first duration occurs before the second duration and the second duration occurs before the third duration.

32. The processing system of claim 28, wherein the second duration is longer in time than the first duration.

33. The processing system of claim 28, wherein the driver module is further configured for coupling to a first capacitive pixel associated with a first settling response and a second capacitive pixel associated with a second settling response;
  wherein the first capacitive pixel comprises the first transmitter electrode and a first receiver electrode of the plurality of receiver electrodes;
  wherein the first voltage is greater than the target voltage of the first capacitive pixel; and
  wherein the first voltage and the second voltage are selected based on the first settling response and the second settling response.

* * * * *

UNITED STATES PATENT AND TRADEMARK OFFICE
CERTIFICATE OF CORRECTION

PATENT NO. : 10,095,358 B2
APPLICATION NO. : 13/728691
DATED : October 9, 2018
INVENTOR(S) : Petr Shepelev and Adam L. Schwartz Page 1 of 1

It is certified that error appears in the above-identified patent and that said Letters Patent is hereby corrected as shown below:

In the Claims

In Column 19, Line 51, Claim 14, after "wherein the" insert -- first --.

In Column 19, Line 52-53, Claim 14, delete "transmitter electrode" and insert -- capacitive pixel --, therefor.

In Column 21, Line 12, Claim 28, after "coupled" insert -- to --.

In Column 21, Line 13, Claim 28, after "the" delete "drive".

Signed and Sealed this
Twenty-first Day of April, 2020

Andrei Iancu
*Director of the United States Patent and Trademark Office*